United States Patent [19]

Yagi et al.

[11] Patent Number: 5,078,008
[45] Date of Patent: Jan. 7, 1992

[54] APPARATUS FOR CONTROLLING OUTPUT SHAFT TORQUE OF AN ENGINE IN AN ENGINE TESTER BY CORRECTING INERTIA OF DYNAMOMETER

[75] Inventors: Hiroyuki Yagi, Yokohama; Yoshi Ishii, Tokyo; Jun Inose, Kawasaki; Mitsunobu Sekiya, Yokohama, all of Japan

[73] Assignee: Ono Sokki Co., Ltd., Tokyo, Japan

[21] Appl. No.: 570,506

[22] Filed: Aug. 21, 1990

[30] Foreign Application Priority Data

Aug. 29, 1989 [JP] Japan .................................. 1-220469

[51] Int. Cl.⁵ ............................................. G01M 15/00
[52] U.S. Cl. .................................................... 73/117
[58] Field of Search ...................... 73/116, 117, 117.2, 73/17.3, 862.16, 862.17, 862.18

[56] References Cited

U.S. PATENT DOCUMENTS 4,758,967  7/1988  Shmuter et al. .................. 73/862.18
4,825,690  5/1989  Mears ................................ 73/862.18

OTHER PUBLICATIONS

"AC Electric Dynamometer System for End-of-Line Engine Hot Test", by J. Bradley, et al., SAE Paper 840563, pp. 77-88.

Primary Examiner—Robert Raevis
Attorney, Agent, or Firm—Fleit, Jacobson, Cohn, Price, Holman & Stern

[57] ABSTRACT

An apparatus for controlling output shaft torque of an engine in an engine tester by correction inertia of the dynamometer, comprising an operation pattern generator, a dynamometer processing unit, a dynamometer controller, and a dynamometer. The torque signal fed back to the dynamometer controller is not from the shaft torque meter but is of the dynamometer torque, and is not affected by the torsional vibration, and is controlled with good stability. Further, no time lag caused by the inertia of the dynaomometer develops in controlling the torque of the output shaft. Therefore, the torque of the output shaft can be controlled with high response and accuracy.

7 Claims, 1 Drawing Sheet

APPARATUS FOR CONTROLLING OUTPUT SHAFT TORQUE OF AN ENGINE IN AN ENGINE TESTER BY CORRECTING INERTIA OF DYNAMOMETER

BACKGROUND OF THE INVENTION

1. Field of the Invention

The present invention relates to an apparatus for controlling output shaft torque of an engine in an engine tester.

2. Description of the Prior Art

A conventional apparatus for controlling output shaft torque of an engine in an engine tester according to the prior art has been constituted, as shown in FIG. 2, by an operation pattern generator 1, a dynamometer controller 3 connected thereto so as to receive torque setpoint signals of an operation pattern, and a dynamometer 7 in an engine tester of the type of automatic operation apparatus on an engine bench.

In the engine tester, furthermore, a throttle controller 4 is so connected as to receive an engine speed command value signal from the operation pattern generator 1, and a throttle actuator 5 is so connected as to receive an output signal from the throttle controller 4 and as to send its output to an engine E to be tested. A dynamometer 7 is coupled to the output shaft S of the engine E to be tested via a shaft torque meter 6, an engine speed detector 8 provided on the output shaft S is so connected as to output a detection signal, i.e., a signal representing the actual revolution speed of the output shaft S of the engine E in operation to the throttle controller 4.

The dynamometer controller 3 is connected to the dynamometer 7 so as to supply a dynamometer control current which is based upon a dynamometer set torque, and to feed back the shaft torque detected by the shaft torque meter 6.

First, an engine speed command value signal is input to the throttle controller 4 from the operation pattern generator 1, and the output based thereupon is input to the throttle actuator 5 from the throttle controller 4. Therefore, the throttle is actuated by the throttle actuator 5 so that the engine E to be tested is operated at a set speed of revolution in the operation pattern.

The rotational output of the engine E rotates the dynamometer 7 via the output shaft S. At this moment, the actual revolution speed of the output shaft S detected by the revolution detector 8 is fed back to the throttle controller 4, and the throttle is so controlled that the actual speed of revolution of the engine E to be tested may be maintained at a set speed.

On the other hand, a set torque signal is input to the dynamometer controller 3 from the operation pattern generator 1 to give a set torque in the operation pattern to the rotational output of the engine E to be tested. As a result, the dynamometer controller 3 supplies a control current to the dynamometer 7 so that it imparts the set torque. Then, the shaft torque meter 6 feeds the shaft torque back to the dynamometer controller 3, which then supplies a control current such that the actual torque of the output shaft S is maintained at the set torque.

In the conventional apparatuses for controlling output shaft torque of an engine in an engine tester, a value detected by the shaft torque meter is fed back to the dynamometer controller, i.e., the shaft torque is fed back to the dynamometer controller in order to control the torque of the output shaft. In fact, however, the detection of shaft torque is affected by torsional vibration, and it is virtually difficult to control the torque of the output shaft with high response and accuracy.

In order to avoid the effects of torsional vibration, there is a method of controlling the torque of the output shafts by feeding the torque of the dynamometer back to the dynamometer controller. In this case, however, the torque is affected by the inertia of the rotary members such as the dynamometer during the acceleration or deceleration of the engine, and error develops in controlling the torque of the output shaft, making it difficult to control the torque of the output shaft with high response and accuracy.

SUMMARY OF THE INVENTION

The apparatus for controlling output shaft torque of an engine in an engine tester by correcting inertia of the dynamometer, according to the present invention, comprises an operation pattern generator, a dynamometer processing unit, a dynamometer controller, and a dynamometer, wherein the operation pattern generator is so connected as to input a torque set value signal and an engine speed signal to the processing unit, the processing unit is so connected as to calculate the torque corrected for the inertia of the dynamometer (Torque compensated for the inertia of rotary members such as the dynamometer; the same applies to the following) at the time of acceleration or deceleration and as to input to the dynamometer controller an output signal of the dynamometer set torque value which is a difference obtained by subtracting the dynamometer inertia compensation value from the torque set value, and the dynamometer controller is so connected as to receive the dynamometer torque from the dynamometer coupled to the output shaft of the engine to be tested and as to feed a dynamometer control current based upon the dynamometer set torque.

The engine to be tested is operated at a set speed of revolution in an operation pattern, and the rotational output of the engine E to be tested rotates the dynamometer through the output shaft. At this moment, the operation pattern generator outputs a torque set value signal to the processing unit in order to load a set torque in the operation pattern on the rotational output of the engine to be tested. The processing unit calculates a torque compensated for the inertia of the dynamometer on the basis of the angular acceleration or deceleration during the acceleration or deceleration operation in accordance with the operation pattern and the moment of inertia specific to the dynamometer, and subtracts the torque compensated for the inertia of the dynamometer from the set torque inputted from the operation pattern generator in order to find a difference therebetween which represents the dynamometer set torque, i.e., represents a dynamometer setpoint torque corrected to the inertia of the dynamometer. The dynamometer controller that has received the output signal of dynamometer set torque supplies a control current, so that the dynamometer setpoint torque is loaded to the dynamometer.

DESCRIPTION OF THE PREFERRED EMBODIMENT

An embodiment of the invention will now be described in conjunction with the drawings.

Figure 1:
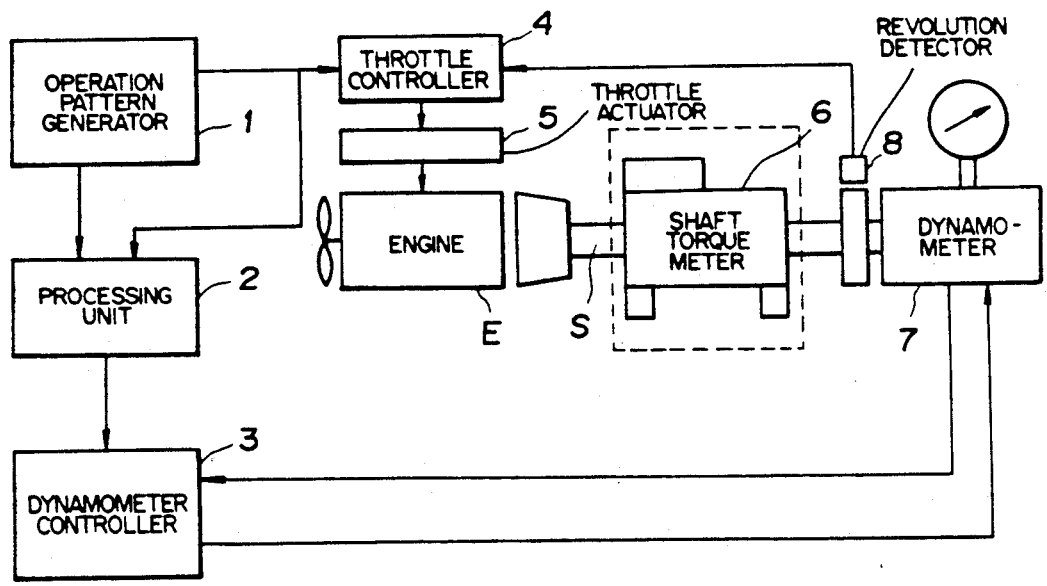
FIG. 1 is a block diagram illustrating the constitution of an apparatus for controlling output shaft torque of an engine by correction for the inertia of the dynamometer in an engine tester of an embodiment according to the present invention.
Figure 2:
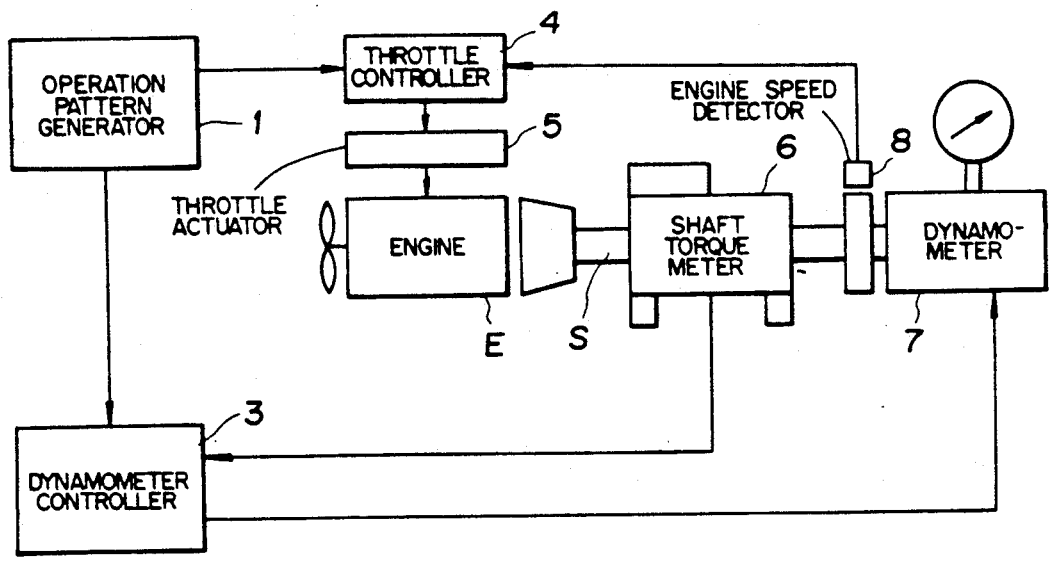
FIG. 2 is a block diagram illustrating the constitution of an apparatus for controlling output shaft torque of an engine in an engine tester according to the prior art.

The apparatus for controlling output shaft torque of an engine by correction for the inertia of the dynamometer, shown in FIG. 1 is adapted to an engine tester of the type of an automatic operation apparatus on an engine bench, and is constituted by an operation pattern generator 1, a processing unit 2, a dynamometer controller 3 and a dynamometer 7.

In an engine tester, furthermore, the throttle controller 4 is connected to the operation pattern generator 1 so as to receive an engine speed command value signal from the operation pattern generator 1, and a throttle actuator 5 is so connected as to receive an output signal from the throttle controller 4 and to send an output thereof to the engine E that is to be tested. Then, the engine E is coupled, and a revolution detector 8 is provided on the dynamometer shaft, the revolution detector 8 being so connected that the detect signal may be input to the throttle controller 4, that is to say, that an actual engine speed signal of the dynamometer during the time the engine E is in operation may be input to the throttle controller 4. As required, furthermore, a shaft torque meter 6 for monitoring purposes is interposed between the output shaft S and the shaft of the dynamometer 7.

In the apparatus for controlling output shaft torque of an engine, the processing unit 2 is connected to the operation pattern generator 1 so as to receive a torque set signal and an engine speed signal from the operation pattern generator 1, and so as to input to the dynamometer controller 3 an output signal of a dynamometer set torque, which is obtained by subtracting the dynamometer inertia correction torque from the set torque. The dynamometer controller 3 is so connected to the dynamometer 7 as to feed a dynamometer control current based on the dynamometer set torque to the dynamometer 7 and as to be fed back with the dynamometer torque from the dynamometer 7.

The processing unit 2, first, finds an angular acceleration (deceleration) $\alpha_i (-\alpha_i)$ of the engine in the operation pattern based on an engine speed command value signal inputted from the operation pattern generator 1. Namely, the difference between a set number of revolutions $n_i$ in each step in the operation pattern and a set number of revolutions $n_{i+1}$ of the next step, is divided by a step time $t_i$, and is multiplied by a conversion coefficient ($2\pi/60$), in order to find an angular acceleration (deceleration) $\alpha_i (-\alpha_i)$ at each of the steps. Then, a moment of inertia J specific to the dynamometer that has been input in advance is multiplied by the angular acceleration (deceleration) $\alpha_i (-\alpha_i)$ of the engine in the operation pattern, and the product, i.e., the dynamometer inertia correction torque $T_{hi}$, is subtracted from the set torque $T_{si}$ inputted from the operation pattern generator 1 in order to find a difference therebetween, i.e., in order to find a dynamometer set torque $T_i$.

The angular acceleration (deceleration) $\alpha_i (-\alpha_i)$ of the engine in the operation pattern may be input to the operation pattern generator 1 in advance of the time of forming the operation pattern.

Described below is the operation of the apparatus for controlling output shaft torque of an engine by correcting the inertia of the dynamometer in the engine tester.

First, an engine speed command value signal is input to the throttle controller 4 from the operation pattern generator 1, and an output of the throttle controller 4 based thereupon is input to the throttle actuator 5, so that the throttle is so operated by the throttle actuator 5 so as to drive the engine E at a set speed in the operation pattern.

The rotational output of the engine E to be tested rotates the dynamometer 7 through the output shaft S thereof. At this moment, the actual revolution speed of the dynamometer shaft detected by the revolution detector 8 is fed back to the throttle controller 4, whereby the throttle is so controlled that the engine E to be tested runs at a speed of revolution equal to the set speed of revolution.

In order to load a set torque of the operation pattern on the rotational output of the engine E to be tested the operation pattern generator 1 sends a torque set signal to the processing unit 2 which finds the dynamometer set torque $T_i$ that is corrected for the inertia of the dynamometer as described earlier. The output signal of set torque $T_i$ is then input to the dynamometer controller 3 which supplies a dynamometer control current to the dynamometer 7 to impart the dynamometer set torque $T_i$ thereto. The dynamometer torque is fed back to the dynamometer controller 3 from the dynamometer 7, and a dynamometer control current is supplied so that the torque of the dynamometer 7 is maintained at the dynamometer set torque $T_i$.

The shaft torque meter 6 for monitoring monitors the actual shaft torque.

According to the apparatus for controlling output shaft torque of an engine by correction for the inertia of the dynamometer in the engine tester of the present invention, the torque signal fed back to the dynamometer controller is not from the shaft torque meter but is of the dynamometer torque that can be easily controlled. Therefore, the torque signal is not affected by the torsional vibration and can be controlled with good stability. Further, even when the engine to be tested is accelerated or decelerated, there is no time lag due to the inertia of the dynamometer in controlling the torque of the output shaft even though the dynamometer torque is fed back. Therefore, the torque of the output shaft can be controlled with high response and accuracy.

We claim:

1. An apparatus for controlling output shaft torque of an engine comprising an operation pattern generator, a dynamometer processing unit, a dynamometer controller, and a dynamometer, wherein the operation pattern generator being connected to output a torque set value signal and an engine speed command value signal to the processing unit, the processing unit is so connected as to calculate a dynamometer inertia correction value at the time of acceleration or deceleration and to output to the dynamometer controller an output signal of dynamometer set torque, said dynamometer set torque signal being a difference obtained by subtracting a dynamometer inertia correction torque, generated in said processing unit, from the torque set value, and the dynamometer controller being connected to receive a dynamometer torque from the dynamometer, coupled to the output shaft of the engine to be tested, as feed back, and to feed a dynamometer control current which is based upon the dynamometer set torque to said dynamometer.

2. An apparatus for controlling output shaft torque of an engine comprising:
   an operation pattern generator for generating an engine speed command value signal;
   a processing unit connected to said operation pattern generator for receiving a torque set signal and said engine speed signal from said operation pattern generator and generating a dynamometer set torque signal representing a set torque for the dynamometer based upon said engine speed signal and a dynamometer inertia correction torque signal;
   a dynamometer; and
   a dynamometer controller coupled between said processing unit and said dynamometer for controlling said dynamometer through a generated dynamometer control current based upon said dynamometer set torque signal received from said processing unit and a feed back signal representing the dynamometer torque;
   wherein the dynamometer inertia correction signal is determined in the processing unit by generating an angular acceleration of the engine from a sample of a set number of revolutions of the engine at two different times, dividing the angular acceleration by the time difference between the samples, multiplying the result by a conversion factor and multiplying this result by a moment of inertia specific to said dynamometer.

3. An apparatus as claimed in claim 2, further comprising a throttle controller, connected to said operation pattern generator, adapted to receive said engine speed command value signal and generate an output signal.

4. An apparatus as claimed in claim 3, further comprising a throttle actuator connected to said throttle controller for receiving said output signal and controlling an engine based upon said output signal.

5. An apparatus as claimed in claim 4, further comprising a shaft torque meter coupled between the dynamometer and engine for monitoring the engine.

6. An apparatus as claimed in claim 5, further comprising a revolution detector positioned on a shaft of the dynamometer for detecting the actual engine speed and delivering a signal representing the actual engine speed to the throttle controller to adjust the engine speed so it may equal a set revolution speed.

7. An apparatus for controlling output shaft torque of an engine comprising:
   an operation pattern generator for generating an engine speed command value signal;
   a throttle controller, connected to said operation pattern generator, adapted to receive said engine speed command value signal and generate an output signal;
   a throttle actuator connected to said throttle controller for receiving said output signal and controlling an engine speed based on said output signal;
   a processing unit connected to said operation pattern generator for receiving a torque set signal and said engine speed signal from said operation pattern generator and generating a dynamometer set torque signal representing a set torque for the dynamometer based upon said engine speed signal and a dynamometer inertia correction torque signal;
   a dynamometer;
   a dynamometer controller coupled between said processing unit and said dynamometer for controlling said dynamometer through a generated dynamometer control circuit based upon said dynamometer set torque signal received from said processing unit and receiving a signal representing the dynamometer torque;
   a shaft torque meter coupled between said dynamometer and an output shaft of the engine for monitoring the engine; and
   a revolution detector positioned on a shaft of the dynamometer for detecting the actual engine speed and delivering a signal representing the actual engine speed to the throttle controller to adjust the engine speed so it may equal a set revolution speed;
   wherein the dynamometer inertia correction signal is determined in the processing unit by generating an angular acceleration of the engine from a sample of a set number of revolutions of the engine at two different times, dividing the angular acceleration by the time difference between the samples, multiplying the result by a conversion factor and multiplying this result by a moment of inertia specific to said dynamometer.

* * * * *